United States Patent
Boss et al.

(10) Patent No.: US 9,154,574 B2
(45) Date of Patent: Oct. 6, 2015

(54) ACTIVATING LOCATION-BASED RESOURCES IN A NETWORKED COMPUTING ENVIRONMENT

(75) Inventors: Gregory J. Boss, Saginaw, MI (US); Lisa Seacat DeLuca, San Francisco, CA (US); Rick A. Hamilton, II, Charlottesville, VA (US); Dana L. Price, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 835 days.

(21) Appl. No.: 13/400,175

(22) Filed: Feb. 20, 2012

(65) Prior Publication Data

US 2013/0219067 A1   Aug. 22, 2013

(51) Int. Cl.
G06F 15/173 (2006.01)
H04L 29/08 (2006.01)
G06F 9/50 (2006.01)
H04W 4/02 (2009.01)

(52) U.S. Cl.
CPC ............ *H04L 67/306* (2013.01); *G06F 9/5027* (2013.01); *H04W 4/02* (2013.01); *G06F 2209/502* (2013.01)

(58) Field of Classification Search
CPC ....... H04W 4/02; H04W 4/021; H04L 67/306
USPC .......................... 709/204–205, 225–226, 229
See application file for complete search history.

(56) References Cited

U.S. PATENT DOCUMENTS

| | | | |
|---|---|---|---|
| 6,473,097 B1* | 10/2002 | Elliott | 715/733 |
| 2009/0005079 A1 | 1/2009 | Shields et al. | |
| 2010/0146118 A1* | 6/2010 | Wie | 709/226 |
| 2011/0137805 A1 | 6/2011 | Brookbanks et al. | |
| 2011/0138048 A1 | 6/2011 | Dawson et al. | |
| 2011/0307523 A1 | 12/2011 | Balani et al. | |
| 2012/0066306 A1* | 3/2012 | Leacock et al. | 709/204 |
| 2012/0254280 A1* | 10/2012 | Parker, II | 709/226 |
| 2013/0151645 A1* | 6/2013 | Siliski et al. | 709/213 |
| 2015/0100684 A1* | 4/2015 | Maes et al. | 709/226 |

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Bharat N Barot
(74) *Attorney, Agent, or Firm* — William E. Schiesser; Keohane & D'Alessandro PLLC; Hunter E. Webb

(57) ABSTRACT

Embodiments of the present invention provide an approach for invocation and de-allocation of networked-based resources (e.g., cloud-based resources) based on users' geographic movements. Specifically, in a typical embodiment, a set (one or more) of user preferences are received. Such preferences can include: a set of geographic points of interest, a set of users, associations of a set of resources (e.g., services, applications, etc.) of the set of users with the set of geographic points of interest, and/or contexts associated with the set of geographic points of interest. A listening service may then be implemented for the set of resources to determine a location of the set of users. Based on the location and the associations of the set of resources with the set of geographic points of interest, at least one of the set of resources may then be activated.

22 Claims, 7 Drawing Sheets

(56) References Cited

OTHER PUBLICATIONS

Mell et al., "The NIST Definition of Cloud Computing", National Institute of Standards and Technology, Information Technology Laboratory, Version 15, Oct. 7, 2009, 2 pages.

Zheng, Y., "Location-Based Services on the Cloud". Microsoft Research, Sep. 3, 2009, 36 pages.

Harm, M., et al., "Event-Triggered Server-Side Macros", http://www.google.com/patents/about?id=_YUnAQAAEBAJ&dq_location . . . 3 pages.

Maitland, J., "Keeping Control Isn't Easy", Chapter 4: Cloud-Based Infrastructure, SearchCloudComputing.com, Publication Date: Oct. 2009, 17 pages.

* cited by examiner

ACTIVATING LOCATION-BASED RESOURCES IN A NETWORKED COMPUTING ENVIRONMENT

TECHNICAL FIELD

In general, embodiments of present invention relate to the activation/invocation and deactivation/de-allocation of networked-based (e.g., cloud computing-based) resources based on user movements. Specifically, embodiments of the present invention relate to the implementation of such an approach either for individualized users, or for groups of users.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Given processing and bandwidth enhancements over recent years, advantages of putting users' informational resources into a networked computing environment such as a cloud environment have become apparent. Challenges may exist, however, in that the user may have a certain set of steps that are necessary to be performed prior to development and testing such implementations. This might include starting or stopping web servers and/or application servers, logging into databases, deploying virtual images, and/or turning on or off other resources. Such a manual process can be both inefficient and error-prone.

SUMMARY

In general, embodiments of the present invention provide an approach for activation and deactivation of networked-based resources (e.g., cloud-based resources) based on users' geographic movements. Specifically, in a typical embodiment, a set (one or more) of user preferences are received. Such preferences can include: a set of geographic points of interest, a set of users, associations of a set of resources (e.g., services, applications, etc.) of the set of users with the set of geographic points of interest, and/or contexts associated with the set of geographic points of interest. A listening service may then be implemented for the set of resources to determine a location of the set of users. Based on the location and the associations of the set of resources with the set of geographic points of interest, at least one of the set of resources may then be instantiated/activated. It is understood that these teachings may be applied to an individual user or to a group of users.

A first aspect of the present invention provides a computer-implemented method for activating location-based resources in a networked computing environment, comprising: receiving a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest; implementing a listening service for the set of resources to determine a location of the set of users; and activating at least one of the set of resources based on the set of locations and the associations of the set of resources with the set of geographic points of interest.

A second aspect of the present invention provides a system for activating location-based resources in a networked computing environment, comprising: a memory medium comprising instructions; a bus coupled to the memory medium; and a processor coupled to the bus that when executing the instructions causes the system to: receive a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest; implement a listening service for the set of resources to determine a location of the set of users; and activate at least one of the set of resources based on the set of locations and the associations of the set of resources with the set of geographic points of interest.

A third aspect of the present invention provides a computer program product for activating location-based resources in a networked computing environment, the computer program product comprising a computer readable storage media, and program instructions stored on the computer readable storage media, to: receive a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest; implement a listening service for the set of resources to determine a location of the set of users; and activate at least one of the set of resources based on the set of locations and the associations of the set of resources with the set of geographic points of interest.

A fourth aspect of the present invention provides a method for deploying a system for activating location-based resources in a networked computing environment, comprising: deploying a computer infrastructure being operable to: receive a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest; implement a listening service for the set of resources to determine a location of the set of users; and activate at least one of the set of resources based on the set of locations and the associations of the set of resources with the set of geographic points of interest.

BRIEF DESCRIPTION OF THE DRAWINGS

These and other features of this invention will be more readily understood from the following detailed description of the various aspects of the invention taken in conjunction with the accompanying drawings in which.

Figure 1:
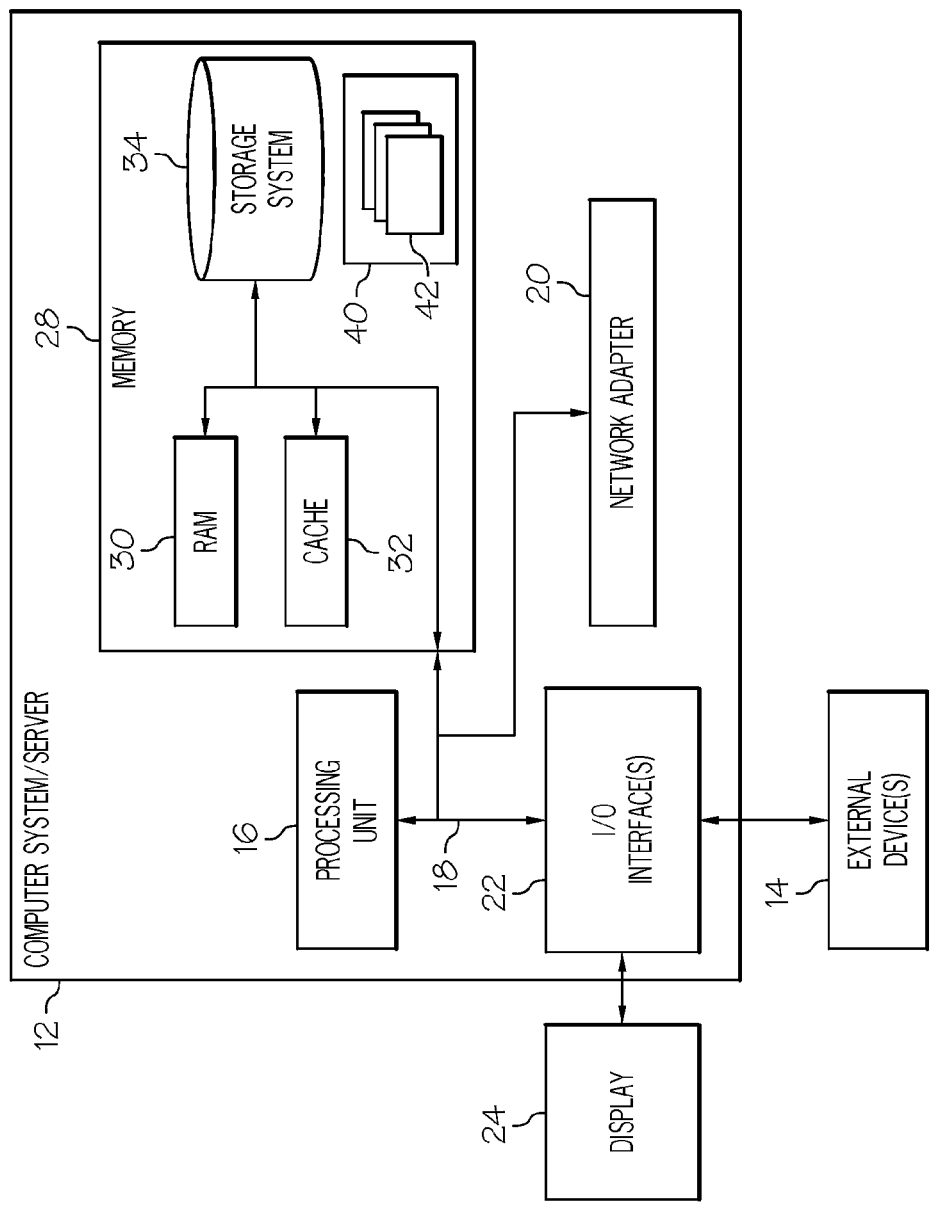
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Further, nn the context of the present invention, "activation" can mean instantiation, allocation, provisioning, and/or the general acquisition and deployment of a networked-based computing resource.

Embodiments of the present invention provide an approach for instantiation/activation/invocation and deactivation/deallocation of networked-based resources (e.g., cloud-based resources) based on users' geographic movements. Specifically, in a typical embodiment, a set (one or more) of user preferences are received. Such preferences can include: a set of geographic points of interest, a set of users, associations of a set of resources (e.g., services, applications, etc.) of the set of users with the set of geographic points of interest, and/or contexts associated with the set of geographic points of interest. A listening service may then be implemented for the set of resources to determine a location of the set of users. Based on the location and the associations of the set of resources with the set of geographic points of interest, at least one of the set of resources may then be instantiated, activated, and/or invoked. It is understood that these teachings may be applied to an individual user or to a group of users.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
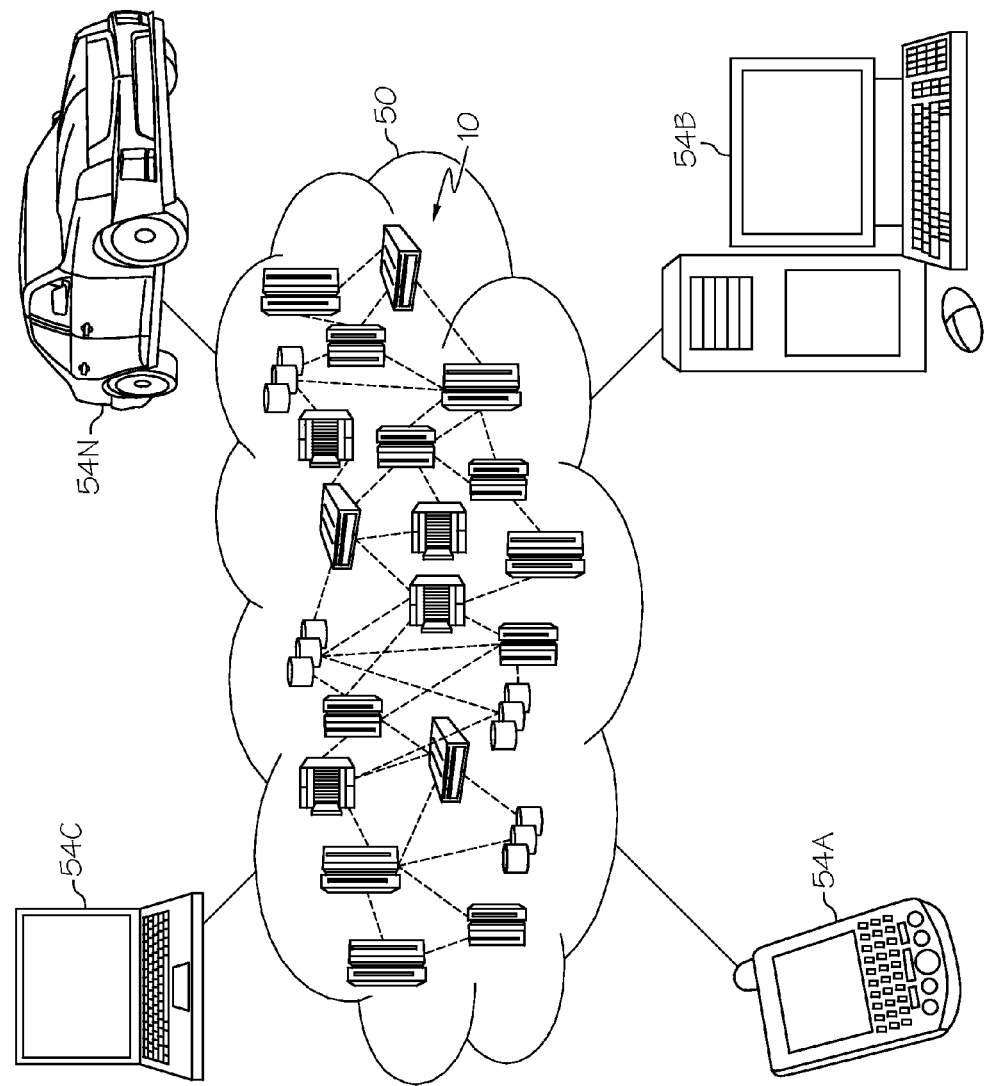
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
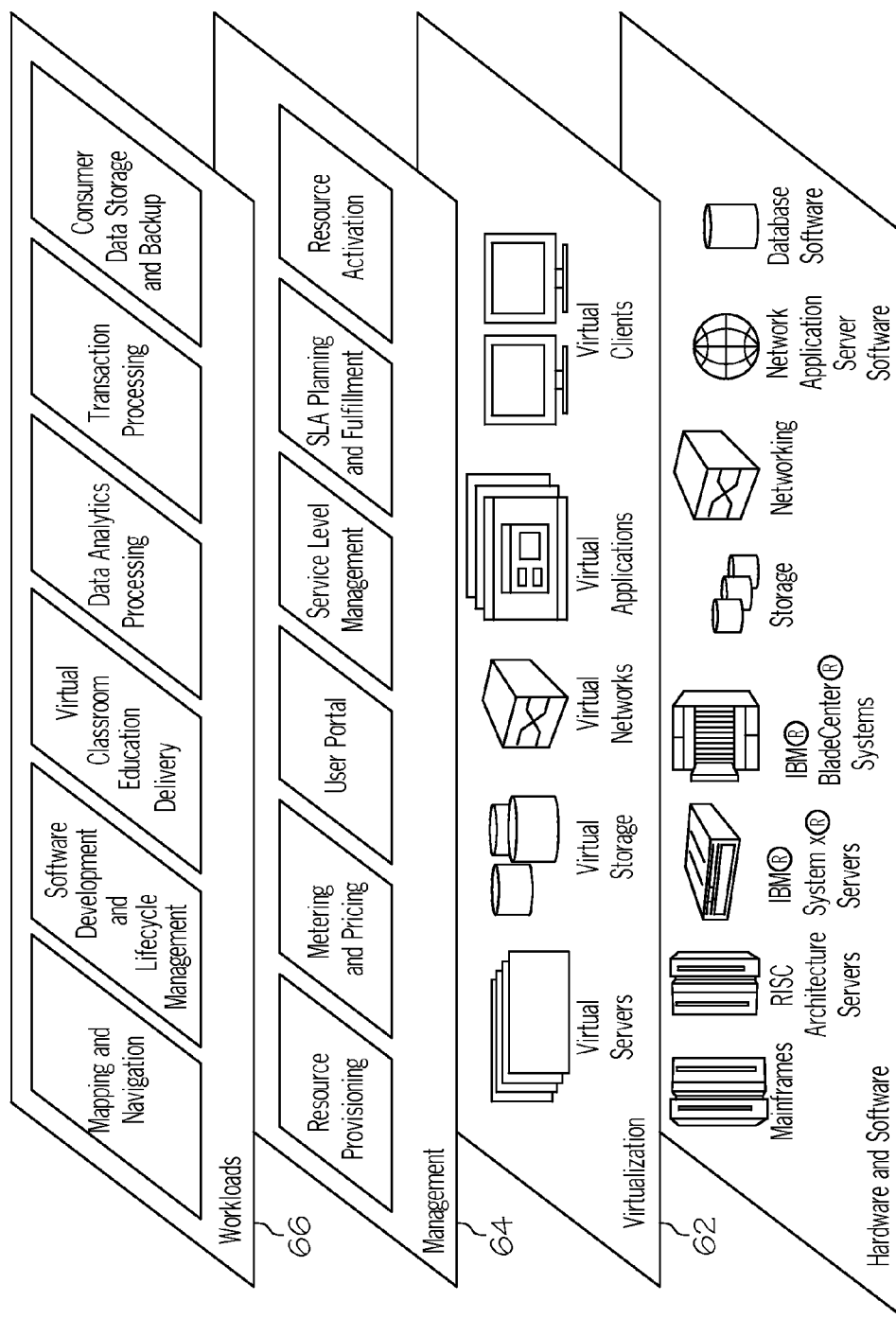
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is resource activation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the resource activation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
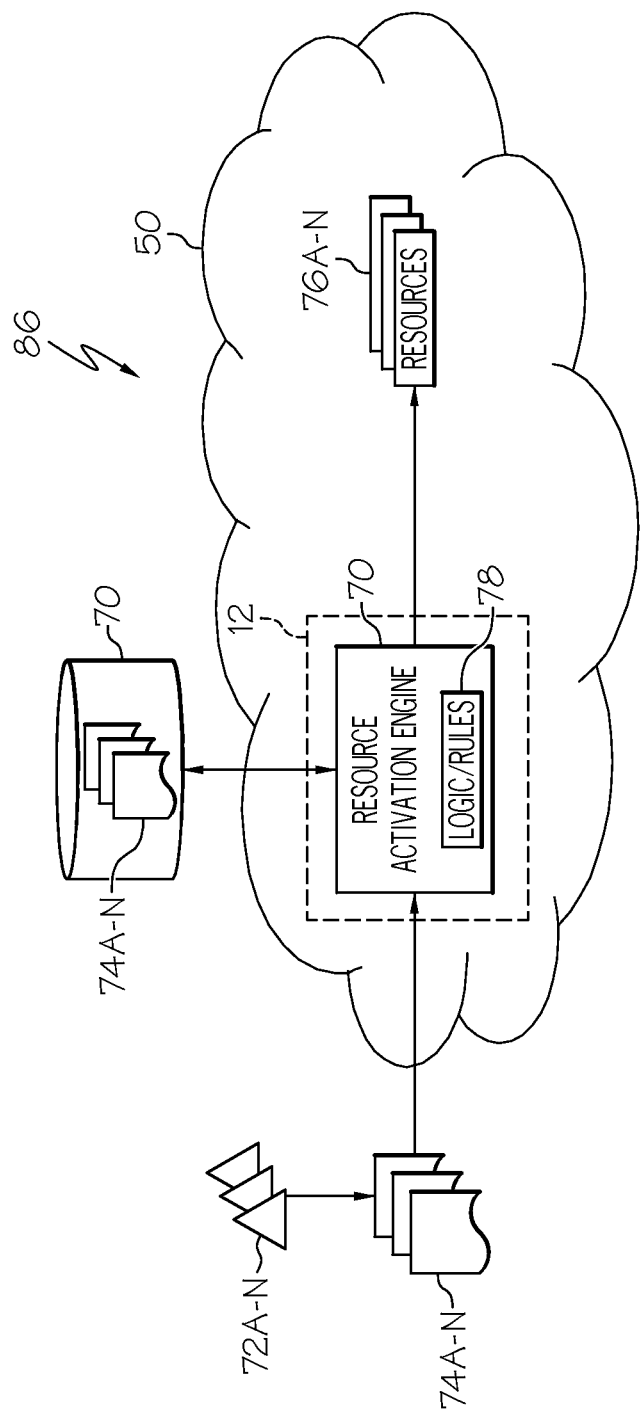
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a resource activation engine (engine 70). Rather, engine 70 could be loaded on a server or server-capable device that communicates (e.g., wirelessly) with the clients to provide location-based resource activation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 78 to provides location-based resource activation hereunder.

Along these lines, engine 70 may perform multiple functions similar to a general-purpose computer. Specifically, among other functions, engine 70 may (among other things): receive a set of user preferences 74A-N in a computer storage device 70 (and/or a computer memory medium such as memory 28 of FIG. 1). In general, the set of user preferences 74A-N may include at least one of the following: a set of geographic points of interest, a set of users 72A-N, associations of a set of resources 76A-N of the set of users 72A-N with the set of geographic points of interest, or contexts associated with the set of geographic points of interest (e.g., user modes, or descriptions of the set of resources). Engine 70 may further: implement a listening service for the set of resources 76A-N based on a location of the set of users 72A-N (e.g., determined by at least one of the following: near field communication devices, cellular technology, global positioning technology, or pattern recognition technology); activate at least one of the set of resources 76A-N based on the location the set of users 72A-N and the associations of the set of resources 76A-N with the set of geographic points of interest (e.g., activate at least one of the set of resources 76A-N when at least one of the set of users 72A-N comes within a predetermined proximity of at least one of the geographic points of interest); deactivate the at least one resource when the at least one user moves beyond the predetermined proximity of at the least one geographic point of interest.

Under the embodiments of the present invention, the teachings described hereinabove may be applied to individual users and/or to groups of users. The sections below will describe both illustrative scenarios in greater detail. It is understood that various examples of resources, etc., will be recited herein below for illustrative purposes only and that the underlying teachings may be applied to other illustrative examples.

Cloud Invocation and De-Allocation Based Upon Individual Users

Under this embodiment, it is recognized that users may access different components of content and/or executables when in different locations. Various geographic locations often represent differing user "contexts," such as work, school, home, or social settings.

For example, a user may generally desire computational environments offering work-related applications and content while in the office; music and games while in the home; and photos (to share) and other social content while in public settings. By preemptively anticipating a user's location (optionally), the context of that location (such as work, home, or school), and the services generally desired in that location, efficiencies are obtained in providing the necessary services for a user at a given location and time. Under this embodiment, the establishment of user preferences, either implicitly or explicitly is first provided. Preference establishment may include one or more of the following steps:

1. Identify points of interests (e.g., offices, sports arenas, etc.), using known techniques. For instance, an office building may be designated as a supporting location based cloud services, a sports arena, or any other place where people congregate. Such a designation can be a manual operation, or it can be automated through an understanding of where people typically engage in operations requiring such services.

2. Determine system users. Users may be predefined ("Joe Smith is now registered as a user of this service") or empirically determined based on usage patterns ("User conforming to identifier 111-222-333 frequently accesses services while in this location"). These are any users that may have a need to invoke cloud services. In some cases, system users could be any person with a mobile computational device, whereas in others, the user could be selected due to profession, employer, paid service, or other criteria.

3. Associate certain cloud resources (e.g., applications or services) with points of interest. Such associations can be universal (for all users) or user-specific. It may be seen that user "Joe Smith" accesses certain cloud services while in the Smith Avenue office, and thus the association may be made.

4. Optionally allow the user to assign each location to a "context," so as to simplify management operations for the user. Users may have multiple workplaces (e.g., corporate offices in several cities could all be considered "work," or numerous areas could likewise be considered "social settings"). By allowing users to mark an office in a city with the "work" context, or allowing users to mark a series of places as "social" contexts, the management of related services is vastly simplified. Rather than users having to explicitly call out services for a given location, or waiting for usage to determine empirical patterns, the provisioning of necessary services can be more easily accommodated by the user selecting a context, than having services provisioned according to this context profile. In some cases, this technique may work in conjunction with known look-up locations or geotags, similar to those used by social networking sites (e.g., utilizing a "check-in" feature).

As noted, these steps may occur in the sequence given, or in differing sequences. Once such user preferences are known, the next step is resource activation/invocation or deactivation/de-allocation or activation of a service subscription. This may entail the following steps:

1. Implement a listening service for cloud-provisioned images or services. This listening service may actively query user locations, or detect movements passively. Such user detection possibilities include the following: "If cellular phone is active with associated services installed, user movements may be reported to the listening service." Other non-cellular detection methods may be derived through standard Location Based Services (LBS) techniques. For example, user location could be determined by near field communication devices (e.g., RFID or associated technologies), global positioning technology, pattern recognition technology (e.g., facial or license plate recognition), etc.

Regardless of chosen architectural approach, the service will note when a user is moving toward, or has entered, a chosen point of interest. Similarly, the service may optionally note when a user exits or moves away from the point of interest. These activities may in turn trigger allocation or de-allocation of services.

Figure 5A:
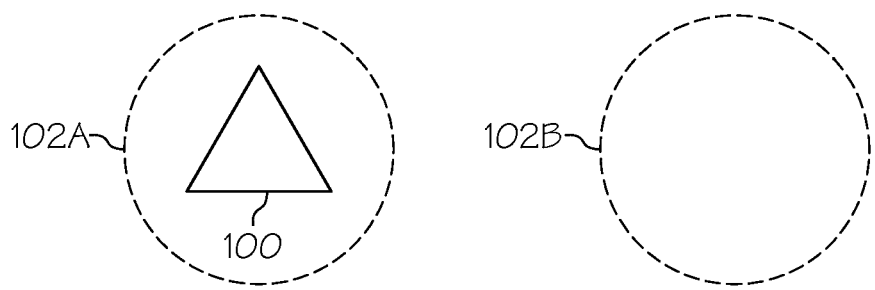
FIGS. 5A-C depict diagrams of one implementation according to an embodiment of the present invention.
Figure 5B:
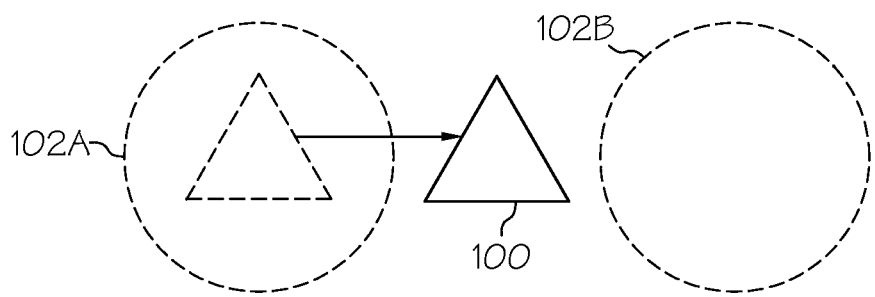
Figure 5C:
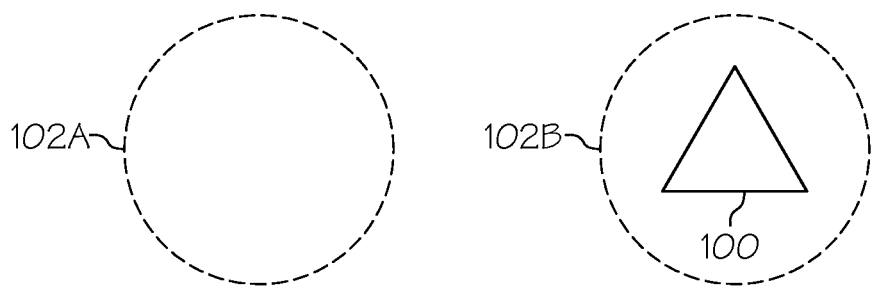

2. Resources will be instantiated, invoked, and/or activated when specific users are moving toward a given location where the specified resource is known to be used. Based upon threshold criteria, cloud resources will be broad online or otherwise made available based on the above-mentioned trigger mechanism, so as to permit better experience for the user. An example of this is shown in FIGS. 5A-C. Specifically, FIGS. 5A-C show the progression of a user 100 as the user 100 moves from geographic location 102A to geographic location 102 B. Once user 100 comes within a predetermined proximity of geographic location 102B, any resources designated in user's 100 preferences may be instantiated, invoked, and/or activated.

3. Optionally, these cloud resources may be deactivate and/or de-allocated and returned to a pool of available resources when users are moving away from place of usage (e.g., as user 100 later moves beyond the predetermined proximity of geographic location 102B).

In some embodiments, users moving away from a place of usage may result in de-allocation. This may be mitigated by thresholds (e.g., a user has to move a certain distance away, or stay away for a prescribed period of time). In yet other embodiments, de-allocation might be accomplished through inactivity (i.e., the movement away from the point of interest may not be the logical trigger).

EXAMPLE 1

Invocation of Cloud Resource

Assume that user "X" is scheduled to take a business trip as determined by a networked-based business calendar. When the system determines that he is headed to the airport and is about to arrive, it queries WiFi networks available at that airport, determines which resource most closely matches the user preferences outlined above and activates an optimal subscription based on the length of the trip, length of the layovers, and transferability of the resource to multiple airports.

As indicated above, user location could be determined by near field communication devices (e.g., RFID or associated technologies), cellular technology (e.g., triangulation or signal strength), global positioning technology, pattern recognition technology (e.g., facial or license plate recognition utilizing remote video cameras or the like), etc.

As further indicated, providing user contexts may improve system usability, allowing greater customization and easier classification of future locations. User contexts, if employed, may be a series of base modes including, but not limited to, work, family, friends, and other such common facets of life. However, a user would ideally be able to customize these contexts to meet highly personalized needs (e.g., "Time with family," "Working on research project," or any other number of elements associated with a person's lifestyle). User contexts, if employed, could be created using any standard web interface, through thick or thin clients, on stationary or mobile computing devices. These could involve selection of predetermined options, or could involve custom naming to meet a user's needs.

User context may be correlated to location in either of two ways. For example, user context may be inferred (e.g., by the nature of content which is requested by the user within a given location). Conversely, user context may be explicitly stated by the user, using drop down, text field population, or any other user input method on a computational device.

Cloud Invocation and De-Allocation Based Upon Masses of Users (e.g., Traffic Patterns)

Drawing upon many of the principles outlined above, it is also recognized that invocation advantages may be achieved by viewing groups in the aggregate. When people come together in sufficient numbers, certain resources may become more desirable, or may be in higher demand (e.g., resources pertaining to locating friends, sports or politically-related news, public transit, or other public facilities). In this embodiment, individual user preferences may or may not be taken into consideration. Rather, detection of mass movement into a given area may be used as a trigger mechanism to invoke such resources, including executables or content. Such detection may likewise be used to allocate additional resources (e.g., hardware) to those instantiations supporting such resources.

Figure 6A:
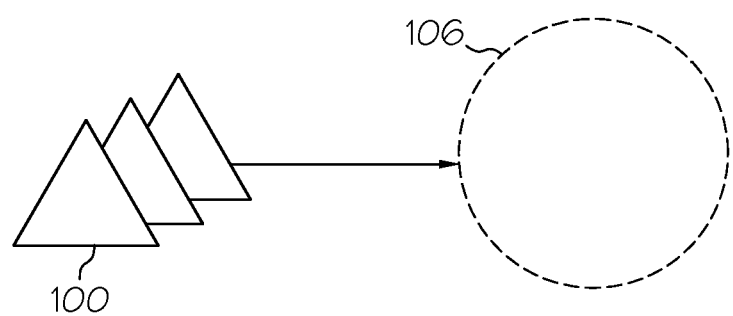
FIGS. 6A-B depict diagrams of another implementation according to an embodiments of the present invention.
Figure 6B:
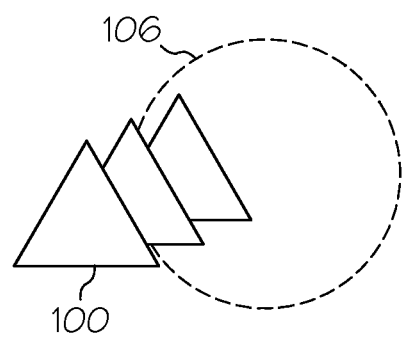

An example of the foregoing is shown in FIGS. 6A-B. Assume in an illustrative example, that group of people 104 begin moving towards a sporting event in geographic location 106. As more and more people occupy a relatively small space, the system provisions additional cloud servers used by the municipalities for communication in order to handle the anticipated increase in usage.

In other embodiments, the type of event can be used to select necessary cloud resources. Event type can be determined by explicit statement by users or administrators, or it may be mined using analytics from social networks, news outlets, and other sources of related text.

In summary, the process may be described as:

(1) Detect that a "critical mass" of individuals is converging on a geographic area.

(2) Determine the nature of resources which will be required by these users. Optionally, determining a certain number of potential consumers sufficient to negotiate a group and/or reduced price for resources rendered for a group or cooperative of people. For example, if a certain number of consumers are present in an Internet Cafécertain number of additional terminals will be activated.

(3) Provision resources accordingly, or allocate additional resources to help provide these resources.

Figure 7:
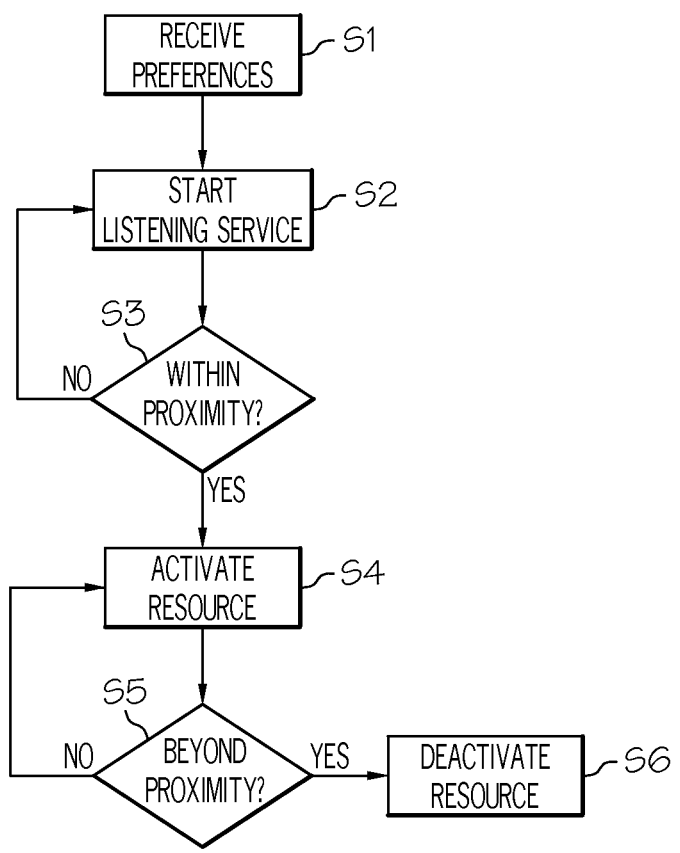
FIG. 7 depicts a method flow diagram according to an embodiment of the present invention.

Referring now to FIG. 7, a method flow diagram according to an embodiment of the present invention is shown. As depicted, in step S1, a set of user preferences (e.g., a set of geographic points of interest, a set of users, associations of a set of resources of the set of users with the set of geographic points of interest, or contexts associated with the set of geographic points of interest) is received. In step S2, a listening service is implemented for the set of resources to determine a location of the set of users. In step S3, it is determined whether at least one of the set of users has come within a predetermined proximity of at least one of the geographic points of interest. If not, the listening service will continue. If so, at least one of the set of resources will be activated in step S4. In step S5, it will be determined whether the at least one user has moved beyond the predetermined proximity of the at least one geographic point of interest. If not, the at least one resource will continue to stay active. If so, the at least one resource will be deactivated in step S6.

While shown and described herein as a resource activation solution, it is understood that the invention further provides various alternative embodiments. For example, in one embodiment, the invention provides a computer-readable/useable medium that includes computer program code to enable a computer infrastructure to provide resource activation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide resource activation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for resource activation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for activating location-based resources in a networked computing environment, comprising:
   receiving a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest;
   implementing a listening service for the set of resources to determine a set of locations of the set of users; and
   activating, by a computer device, at least one of the set of resources based on the set of locations and the associations of the set of resources with the set of geographic points of interest, wherein each of the set of resources is a cloud resource from a shared pool of configurable hardware and software resources that is accessible by the set of users.

2. The computer-implemented method of claim 1, the activating comprising activating, based on the associations, at least one of the set of resources when at least one of the set of users comes within a predetermined proximity of at least one of the geographic points of interest.

3. The computer-implemented method of claim 2, further comprising deactivating the at least one resource when the at least one user moves beyond the predetermined proximity of the at least one geographic point of interest.

4. The computer-implemented method of claim 1, the location being determined by at least one of the following: near field communication devices, cellular technology, global positioning technology, or pattern recognition technology.

5. The computer-implemented method of claim 1, the contexts comprising at least one of the following: user modes or descriptions of the set of resources.

6. The computer-implemented method of claim 1, the set of users comprising a group of individuals converging on a particular location.

7. The computer-implemented method of claim 1, the networked computing environment comprising a cloud computing environment.

8. A system for activating location-based resources in a networked computing environment, comprising:
   a memory medium comprising instructions;
   a bus coupled to the memory medium; and
   a processor coupled to the bus that when executing the instructions causes the system to:
      receive a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest;
      implement a listening service for the set of resources to determine a location of the set of users; and
      activate at least one of the set of resources based on the set of locations and the associations of the set of resources with the set of geographic points of interest, wherein each of the set of resources is a cloud resource from a shared pool of configurable hardware and software resources that is accessible by the set of users.

9. The system of claim 8, the memory medium further comprising instructions for causing the system to activate, based on the associations, at least one of the set of resources when at least one of the set of users comes within a predetermined proximity of at least one of the geographic points of interest.

10. The system of claim 9, the memory medium further comprising instructions for causing the system to deactivate the at least one resource when the at least one user moves beyond the predetermined proximity of the at least one geographic point of interest.

11. The system of claim 8, the location being determined by at least one of the following: near field communication devices, cellular technology, global positioning technology, or pattern recognition technology.

12. The system of claim 8, the contexts comprising at least one of the following: user modes, or descriptions of the set of resources.

13. The system of claim 8, the set of user comprising a group of individuals converging on a particular location.

14. The system of claim 8, the networked computing environment comprising a cloud computing environment.

15. A computer program product for activating location-based resources in a networked computing environment, the computer program product comprising a computer readable storage device, and program instructions stored on the computer readable storage device, to:

receive a set of user preferences in a computer storage device, the set of user preferences comprising at least one of the following: a set of geographic points of interest, a set of users, associations of a set of resources of the set of users with the set of geographic points of interest, or contexts associated with the set of geographic points of interest;

implement a listening service for the set of resources to determine a location of the set of users; and activate at least one of the set of resources based on the set of locations and the associations of the set of resources with the set of geographic points of interest, wherein each of the set of resources is a cloud resource from a shared pool of configurable hardware and software resources that is accessible by the set of users.

16. The computer program product of claim 15, the computer readable storage device further comprising instructions to activate, based on the associations, at least one of the set of resources when at least one of the set of users comes within a predetermined proximity of at least one of the geographic points of interest.

17. The computer program product of claim 16, the computer readable storage device further comprising instructions to deactivate the at least one resource when the at least one user moves beyond the predetermined proximity of the at least one geographic point of interest.

18. The computer program product of claim 15, the location being determined by at least one of the following: near field communication devices, cellular technology, global positioning technology, or pattern recognition technology.

19. The computer program product of claim 15, the contexts comprising at least one of the following: user modes, or descriptions of the set of resources.

20. The computer program product of claim 15, the set of user comprising a group of individuals converging on a particular location.

21. The computer program product of claim 15, the networked computing environment comprising a cloud computing environment.

22. A method for deploying a system for activating location-based resources in a networked computing environment, comprising:

deploying a computer infrastructure having at least one computer device that operates to:

receive a set of user preferences in a computer storage device, the set of user preferences comprising at least one of the following: a set of geographic points of interest, a set of users, associations of a set of resources of the set of users with the set of geographic points of interest, or contexts associated with set the of geographic points of interest;

implement a listening service for the set of resources to determine a location of the set of users; and activate at least one of the set of resources based on the set of locations and the associations of the set of resources with the set of geographic points of interest, wherein each of the set of resources is a cloud resource from a shared pool of configurable hardware and software resources that is accessible by the set of users.

* * * * *